United States Patent Office 3,804,870
Patented Apr. 16, 1974

3,804,870
RHODIUM AND IRIDIUM NO-CONTAINING COMPLEXES
William B. Hughes, and Ernest A. Zuech, Bartlesville, Okla., assignors to Phillips Petroleum Company
No Drawing. Application Sept. 17, 1970, Ser. No. 73,232, now Patent No. 3,721,718, which is a division of application Ser. No. 810,021, Mar. 24, 1969, now Patent No. 3,558,517, dated Jan. 26, 1971, which is a continuation-in-part of application Ser. No. 717,025, Mar. 28, 1968, now abandoned, which is a continuation-in-part of application Ser. No. 696,109, Jan. 8, 1968, now abandoned, which in turn is a continuation-in-part of application Ser. No. 635,688, May 3, 1967, now abandoned. Divided and this application Dec. 20, 1972, Ser. No. 316,918
Int. Cl. C07f 15/00
U.S. Cl. 260—429 R   19 Claims

ABSTRACT OF THE DISCLOSURE

A process for the conversion of olefinic hydrocarbons according to the olefin reaction (e.g., the olefin disproportionation reaction) by contacting the olefinic hydrocarbon with a catalyst comprising a compound of ruthenium, iron, osmium, rhodium, cobalt or iridium complexed with a selected complexing agent (e.g. triphenylphosphine) and combined with an organoaluminum compound (e.g., methylaluminum sesquihalide). A process of preparing rhodium and iridium NO-containing complexes is described. Metal complexes which contain both NO and $NO_2$ complexing agents are also described.

---

This application is a divisional application of copending S.N. 73,232 filed Sept. 17, 1970, now Pat. No. 3,721,-718, which is a division of copending application Ser. No. 810,021, filed Mar. 24, 1969, now U.S. Letters Patent 3,558,517 issued Jan. 26, 1971, which is a continuation-in-part of application Ser. No. 717,025, filed Mar. 28, 1968, now abandoned, which is a continuation-in-part of application Ser. No. 696,109, filed Jan. 8, 1968, now abandoned, and which is a continuation-in-part of application Ser. No. 635,688, filed May 3, 1967, now abandoned.

This invention relates to the conversion of olefin hydrocarbons and to a catalyst system for such conversion. In one aspect this invention relates to the olefin reaction. In another aspect it relates to the conversion of olefins to other olefins having different molecular weights. In still another aspect it relates to a novel, homogeneous, multi-component complex catalyst. In still a further aspect it relates to a new method of preparing complex compounds of transition metals. In still a further aspect it relates to new complex compounds of transition metals.

The term olefin reaction, as used herein, is defined as a process for the catalytic conversion in the presence of a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acylic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyene; for example, the conversion of ethylene and 4-methylpentene-2 yields 3-methylbutene-1 and propylene;

(4) The conversion of ethylene and an acyclic mono- or polyene having three or more carbon atoms and a cyclic mono- or cyclic polyene to produce an acyclic polyene having a higher number of carbon atoms than that of any of the starting materials; for example, the conversion of cyclooctene and 2-pentene yields 2,10-tridecadiene; the conversion of 1,5-cyclooctaidene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene and continued reaction can give higher molecular weight materials;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and a lower number of carbon atoms than that of the feed material; for example, the conversion of 1,4-pentadiene yields 1,4-cyclohexadiene and ethylene.

New catalytic processes have been discovered in recent years for the conversion of olefins to other olefinic products including products of both higher and lower molecular weight whereby olefins of relatively low value are converted into olefins of higher value. Such conversions have heretofore been carried out using heterogeneous catalysts comprising compounds such as compounds of molybdenum or tungsten and generally associated with materials such as alumina or silica. It has now been found that these olefin conversions can be carried out in a substantially homogeneous state using, as catalyst, selected coordination complexes of ruthenium, iron, osmium, cobalt, rhodium or iridium in combination with suitable catalytic adjuvants such as aluminum-containing compounds to produce olefin products of increased value including solid products, for example rubber suitable for the manufacture of tires, wire coating, footwear and other industrial products.

Further in accordance with the invention, we have discovered new rhodium or iridium complexes which in combination with the catalytic adjuvant materials provide a catalyst which is capable of producing olefin products of increased value.

Further in accordance with the invention, we have discovered an improved method for the preparation of certain rhodium and iridium complexes which, when combined with suitable catalytic adjuvants, form a catalyst capable of providing olefin products of increased value.

It is an object of this invention to provide a method and a homogeneous catalyst for the conversion of olefin hydrocarbons. It is also an object of this invention to provide a homogeneous catalyst comprising a coordination complex of ruthenium, iron, osmium, cobalt, rhodium or iridium together with an aluminum-containing adjuvant for the conversion of olefin hydrocarbons.

It is a further object of the invention to provide an improved method of preparing coordination complexes of rhodium and iridium. Still another object of the invention is to provide new complexes of rhodium and iridium which, together with an aluminum-containing adjuvant, are capable of converting olefin hydrocarbons.

A further object is to provide a homogeneous catalyst for the olefin reaction. Still another object is to provide a method for converting olefins to other olefins of higher and lower number of carbon atoms utilizing a homogeneous catalyst. The provision of a homogeneous catalyst for converting olefins to other olefins of higher and lower number of carbon atoms is yet another object of the invention. Other aspects, objects and advantages of the invention will be apparent to one skilled in the art upon study of the disclosure, including the detailed description of the invention.

According to the process of this invention, cyclic and acrylic olefins, preferably non-tertiary olefins, and mixtures of these, including mixtures with ethylene, are converted into other olefins with a catalyst system which forms by the admixture, under catalyst forming conditions, of components comprising (a) A complex which forms, under complex forming conditions, of a compound of a metal of the iron or cobalt subgroups of Group VIII with at least one ligand-forming material; and (b) An aluminum-containing catalytic adjuvant under conditions of time, temperature, and pressure suitable to form products different from the feed olefin.

The ligand-forming material of the metal complex of the (a) component is represented by the formulae: NO; NOX; $R_3Q$; $R_2\text{—}QR_2$; $R_2N\text{—}R^2\text{—}NR_2$; CO; compounds containing the radical $(CHR^4=CR^4\text{—}CH_2)$; unsubstituted or $R^5$-substituted pyridines; unsubstituted or $R^5$-substituted 2,2'-bipyridines; unsubstituted or R-substituted cyclopentadienyl radical-containing compounds;

R—S—R, $R^5(CN)_y$, $R^5(COO)_y$ radical-containing compounds; 1,5-cyclooctadiene; dicyclopentadiene; or norbornadiene, wherein X is halogen, R is an aromatic or saturated aliphatic hydrocarbon radical, including alkoxy and halo-substituted radicals, having up to 20 carbon atoms, $R^1$ is hydrogen or R, $R^2$ is a divalent R radical, $R^3$ is a divalent saturated or ethylenically unsaturated aliphatic hydrocarbon radical having 4 to 10 carbon atoms, $R^4$ is hydrogen or a methyl radical; $R^5$ is an aromatic, saturated or ethylenically unsaturated aliphatic radical having up to 30 carbon atoms, Q is phosphorus, arsenic or antimony, and y is an ineger from 1 to 2.

The catalyst system of the invention can further be illustrated by the following formulas, i.e., the catalyst system consists of (a) A metal complex represented by the formula:

$$[(L)_a(Y)_bM_cZ_d]_x$$

wherein M is a metal of the iron or cobalt subgroups of Group VIII, namely iron, ruthenium, osmium, cobalt, rhodium, and iridium; each Z is halogen or CN, SCN, OCN, $SnCl_3$, or an organic acid radical having up to about 30 carbon atoms; each (Y) is NO or a $$(CHR^4\text{—}CR^4\text{—}CH_2)\text{—}$$

radical; each (L) is a ligand represented by $R_3Q$, $$R_2Q\text{—}QR_2,$$

$$RNR_2^1, CO, R_2N\text{—}R^2\text{—}NR_2$$

unsubstituted or $R^5$-substituted pyridines, unsubstituted or $R^5$-substituted 2,2'-bipyridines, unsubstituted or R-substituted π-cyclopentadienyl radicals,

R—S—R, $R^5(CN)_y$, $R^5(COO)_y$, 1,5-cyclooctadiene, dicyclopentadiene, or norbornadiene; a is 0–6, b is 1–2, y is 1–2, but when y is 2, $R^5$ of the $R^5(CN)_y$ and $R^5(COO)_y$ is a divalent radical and as otherwise defined; c is 1–3, d is 0–6, x is a number which is indicative of the polymeric state of the complex, and wherein the number of (L), (Y), and Z groups present in the complex is not greater than the number required for the metal to achieve the closed shell electronic configuration of the next higher atomic number inert gas; when M is Ru or Os, b is 0–2; when M is Fe, (Y) is NO and b is 2; R is an aromatic or saturated aliphatic hydrocarbon radical, including alkoxy and halo-substituted radicals, having up to 20 carbon atoms; $R^1$ is hydrogen or R; $R^2$ is a divalent R radical; $R^3$ is a divalent saturated or ethylenically unsaturated aliphatic hydrocarbon radical having from 4 to 10 carbon atoms; $R^4$ is hydrogen or a methyl radical; $R^5$ is an aromatic, saturated aliphatic, or ethylenically unsaturated aliphatic radical having up to 30 carbon atoms; and Q is phosphorus, arsenic or antimony; with (b) An aluminum-containing catalytic adjuvant selected from (1) $R_eAlX_f$,
(2) a mixture of compounds of (1),
(3) a mixture of one or more $R_eAlX_f$ or $AlX_3$ compounds with one or more compounds having the formula $$R^1_gM^1X_h$$

or (4) an $AlX_3$ compound wherein each R is an aromatic or saturated aliphatic hydrocarbon radical having up to 20 carbon atoms including alkoxy and halo derivatives thereof, preferably an alkyl radical having up to 10 carbon atoms; each $R^1$ is hydrogen or R; each X is halogen; each $M^1$ is a metal of Group I–A, II–A, II–B, or III–A; e is 1, 2 or 3, f is 0, 1 or 2, the sum of e and f being 3; g is 1, 2 or 3, h is 0, 1 or 2, the sum of g and h being equal to the valence of $M^1$; when the adjuvant is (1) and acyclic olefins are converted, f is preferably 1 and 2.

Further according to the invention, nitro-nitrosyl complexes of rhodium or iridium of the type $$(R_3Q^1)_2M^2(NO)(NO_2)X$$

are provided wherein $Q^1$ is phosphorous or arsenic, $M^2$ is rhodium or iridium, and R and X are as described previously. These novel nitro-nitrosyl complexes may be used as the (a) component of the catalyst system of the invention.

Still another feature of the present invention is an improved method of preparing complex compounds of the type $(R_3Q^1)_2M^2(NO)X_2$ (a) by reacting compounds of the type $M^2X_3$ with NO followed by reaction of this reaction product with compounds of the type $R_3Q^1$ or (b) by reacting compounds of the type $(R_3Q^1)_3M^2X$ with NOX compounds wherein $M^2$, R, $Q^1$, and X are as defined earlier.

The elements referred to herein are in accordance with the Periodic Table of Elements appearing in Handbook of Chemistry and Physics, Chemical Rubber Company, 45th edition (1964).

Some specific examples of $R_eAlX_f$ and $AlX_3$ compounds are: methylaluminum sesquichloride, methylaluminum dichloride, dimethylaluminum fluoride, ethylaluminum dichloride, aluminum trichloride, ethylaluminum sesquichloride, diethylaluminum chloride, di(3 - ethoxypropyl)aluminum bromide, aluminum tribromide, di-(methoxymethyl)aluminum bromide, di-(2 - ethylhexyl)aluminum bromide, phenylaluminum dichloride, benzylaluminum diiodide, di(4,4,4 - trifluorobutyl)aluminum chloride, dieicosylaluminum bromide, and the like, and mixtures thereof.

Some specific examples of the $$R_g^1 M^1 X_h$$

compounds are: phenyllithium, t-butylpotassium, methylsodium, benzylrubidium, lithium hydride, anthrylcesium, lithium aluminum hydride, diethylberyllium, lithium borohydride, methylcadmium chloride, diethylzinc, dicyclohexylmercury, triethylaluminum, methylgallium dibromide, triethylindium, di(12-chlorododecyl)aluminum chloride, n-butylboron difluoride, hexylzinc iodide, triisopropylthallium, dimethylcalcium, dimethylstrontium, diethylbarium, and the like, and mixtures thereof.

The preferred (b) components of the catalyst system are adjuvants selected from (1) or (2).

The Group VIII metal complex (a) components of the catalyst system can be formed by the admixture, under complex forming conditions of a compound of a suitable metal found in the iron or cobalt subgroups of Group VIII such as a halide, carbonyl, carbonyl halide, or salt of an inorganic or organic acid, preferably a halide, with one or more complexing agents represented by NO, NOX, $(CHR^4=CR^4-CH_2)$ radical-containing compounds, $R_3Q$, $R_2Q-QR_2$, $$RNR_2^1$$

$R_2N-R^2-NR_2$, CO, unsubstituted or $R^5$-substituted pyridines, unsubstituted or $R^5$-substituted 2,2'-bipyridines, unsubstituted or R-substituted cyclopentadienyl radical-containing compounds,

R—S—R, $R^5(CN)_y$, $R^5(COO)_y$ radical-containing compounds, 1,5-cyclooctadiene, dicyclopentadiene, or norbornadiene, wherein X is a halogen and R, $R^1$, $R^2$, $R^3$, $R^4$, $R^5$, b, y and Q are as previously defined, and wherein at least one of NO, NOX or $(CHR^4=CR^4-CH_2)$ radical-containing compounds are in the admixture when cobalt, rhodium, or iridium compounds are used, and wherein at least one of NO or NOX are in the admixture when iron compounds are used.

Frequently preferred metal complex (a) components are those which contain halogen atoms. Consequently, it it frequently desirable to use nitrosyl halides in preference to NO when forming the metal complex as shown above. Nitrosyl halides, however, can be used if desired, even though the Group VIII starting compound is a halide.

Some examples of suitable Group VIII starting compounds are $FeCl_3$, $Fe(CO)_5$, $Fe(CO)_5Cl_2$, $Fe(CO)_2I_2$, $Fe_2(CO)_9$, $FeBr_3$, $FeF_3$, $Fe_2(oxalate)_3$, $Fe(CNS)_3$, $Fe(acetate)_2$, $FeBr_2$, $FeCl_2$, $Fe_2Fe(CN)_6$, $RuCl_2$, $RuCl_3$, $RuCl_4$, $Ru(CO)_2I_2$, $Ru(CO)Br$, $OsCl_2$, $OsCl_3$, $OsCl_4$, $Os(CO)_4Cl_2$, $Os(CO)_3Br_2$, $Os(CO)_2I_2$, $[Os(CO)_4X]_2$, $CoBr_2$, $CoCl_2$, $Co(CN)_2$, $CoF_2$, $CoI_2$ $[Co(CO)_4]_2$, $[Co(CO)_3]_4$. $Co(CO)I_2$, $RhCl_3$, $[Rh(CO)_4]_2$, $$[Rh_3(CO)_8]_2$$

$[Rh(CO_2X]_2$, $IrBr_3$, $IrCl_3$, $IrCl_4$, $[Ir(CO)_4]_2$, $$[Ir(CO)_3]_4$$

$Ir(CO)_3Br$, $Ir(CO)_2Cl_2$, and the like, and mixtures thereof.

Some examples of suitable complexing agents are: tri-n-butylphosphine; tri-n-decylphosphine; tri-n-eicosylphosphine; methyl-di - n - octylphosphine; tricyclohexylphosphine; triphenylphosphine; tribenzylphosphine; triethylarsine; triisopropylarsine; tri-n-pentadecylarsine; diethyl-n - tridecylarsine; tricyclopentylarsine; tri(4 - cyclohexylbutyl)arsine; diethylphenylarsine; tri(3,6-diphenyloctyl)arsine; tri-t-butylstibine; tri-n-nonylstibine; tri(6,8-di-n-butyldecyl)stibine; tri(3,5 - dimethylcyclohexyl)stibine; methyldicyclohexylstibine; tri(2,4,6 - triethylphenyl)stibine; methyldi(4-dodecylphenyl)stibine; nitrosyl chloride; nitrosyl bromide, nitric oxide, tetramethyldiphosphine, tetrabutyldiarsine, tetradecyldiphosphine, tetraphenyldistilbene, tetrabenzyldiphosphine, tetracyclopentyldiphosphine, tetraethyldiarsine, acetic acid, propionic acid, butanoic acid, 2-methylpropionic acid, pentanoic acid, octanoic acid, oxalic acid, benzoic acid, phenylacetic acid, malonic acid, acetonitrile, ethylenedinitrile, butyronitrile, 1,2-cyclohexylenedinitrile, sodium cyclopentadienylide, potassium - methylcyclopentadienylide, allyl bromide, methallyl chloride, crotyl bromide, tetrallyltin, tetramethallyltin, ethylamine, trimethylamine, triphenylamine, dibutylamine, N,N,N',N' - tetramethylethylenediamine, N, N' - dibenzylethylenediamine, 1,5 - cyclooctadiene, dicyclopentadiene, norbornadiene, and the like, and mixtures thereof.

Some examples of suitable Group VIII metal complex (a) components are:

(methyldiphenylarsine)$_4$RuCl$_2$,
(triphenylphosphine)$_3$CORuCl$_2$,
(tributylphosphine)$_2$(Co)RuBr$_3$,
(cyclopentadienyl)(CO)$_2$RuBr,
(diethylphenylarsine)$_3$(CO)RuCl$_2$,
(triphenylphosphine)$_2$(CO)RuBr$_3$,
(triphenylphosphine)$_4$(CO)$_2$Ru$_2$(SnCl$_3$)Cl$_3$,
(triphenylphosphine)$_3$OsBr$_3$,
(triphenylstibine)$_3$OsBr$_3$,
(triphenylstibine)$_4$OsBr$_2$,
NO-treated triphenylphosphine-treated IrCl$_3$,
NO-treated CO-treated IrCl$_3$,
(triphenylarsine)$_2$OsBr$_4$,
(diethylphenylphosphine)$_3$OsCl$_3$,
[(NO)$_2$FeBr]$_2$,
[(NO)$_2$FeCl]$_2$,
(triphenylphosphine)Fe(NO)$_2$Cl$_2$
Ru(NO)I$_2$,
(pyridine)$_2$RuI$_2$,
(tributylarsine)$_2$Ru(NO)Cl$_3$,
(pyridine)$_2$Ru(NO)Br$_3$,
(Co$_2$(NO)$_2$Os,
NO-treated RuCl$_3$,
NO-treated triphenylphosphine-treated RuCl$_3$,
(NO)$_2$RhCl,
(triphenylphosphine)$_3$Ir(NO),
(NO)$_2$CoBr,
(triphenylphosphine)$_2$Ir(NO)$_2$,
(NO)$_2$IrI,
[(π-allyl)$_2$RhCl]$_2$
(NO)$_2$CoI,
(π-methallyl)(triphenylphosphine)RhBr,
(π-crotyl)(tributylphosphine)CoCl,
(π-allyl)(triphenylphosphine)$_2$RhCl,
(π-allyl)(triphenylphosphine)$_2$Rh(CO)Cl,
(π-allyl)(triphenylphosphine)$_2$RhCl,
(π-methallyl)$_2$RhCl, ($\pi$-allyl)$_2$(pyridine)RhCl,
($\pi$-allyl)$_2$(cyclopentadienyl)Rh,
($\pi$-allyl)(cyclopentadienyl)RhCl,
($\pi$-allyl)$_3$Rh,
($\pi$-methallyl)(2,2'-bipyridine)RhCl$_2$,
($\pi$-crotyl)(cyclopentadienyl)RhCl,
($\pi$-methallyl)(pyridine)$_2$RhCl$_2$,
($\pi$-allyl)(1,5-COD)Rh,
NOCl-treated (triphenylphosphine)$_3$RhCl,
NO-treated (triphenylphosphine)$_3$RhCl,
NO-treated triphenylphosphine-treated RhCl$_3$,
(triphenylphosphine)$_2$CoCl$_2$,
(4-vinylpyridine)$_2$CoCl$_2$,
NO-treated CO-treated RuCl$_3$,
CO-treated triphenylphosphine-treated RuCl$_3$,
($\pi$-allyl)(cyclopentadienyl)IrBr, and the like, and mixtures thereof.

The formula $[(L)_a(Y)_bM_cZ_d]_x$ is used herein to identify the product obtained by the admixture, under catalyst forming conditions, of the metal compound with one or more ligand-forming materials whether or not the components are present in the complex as indicated in the formula.

When the (a) component of the catalyst system is the product obtained by combining a suitable Group VIII metal compound with 1 or more suitable ligand-forming materials, these materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal salt to the selected ligand-former can be in the range of from about 0.1:1 to about 10:1, preferably from about 0.5:1 to about 2:1. The products are obtained by combining these ingredients at a temperature preferably in the range of from about 0 to about 130° C., more preferably 20 to about 60° C., for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system. In general, the (a) component of the catalyst system is fully prepared before contact is made with the (b) component or adjuvant.

When the (a) component of the catalyst system is a rhodium or iridium complex of the type $$(R_3Q^1)_2M^2(NO)(NO_2)X$$

starting compounds of the type 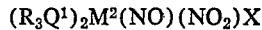 in a diluent such as that described above are treated with NO under conditions of time and temperature suitable for the formation of the desired nitro-nitrosyl complex. Preferably, an amount of NO is used which is somewhat in excess of the stoichiometric amount in order to increase the rate of formation of the new complex compound. In a similar manner, compounds of the type $(R_3Q^1)_2M^2(CO)X$ can be reacted with NO to produce the nitro-nitrosyl complexes.

Still another method for obtaining these rhodium or iridium nitro-nitrosyl complexes is by reacting compounds of the type $(R_3Q^1)_2M^2(CO)(NO_2)$ with NOX compounds under conditions of time, temperature, and diluent as described above, except that in this reaction approximately stoichiometric amounts of NOX are preferred. Up to about a 10 percent excess of the stoichiometric amounts of NOX can be tolerated. Thus, approximately one mole of NOX compound is used to react with each mole of $(R_3Q^1)_2M^2(CO)(NO_2)$ compound.

Suitable rhodium or iridium compounds which can be reacted with the NO or NOX compounds as shown above are commercially available or are conventionally prepared. For example, the $(R_3Q^1)_3M^2X$ compounds can be suitably prepared by reacting $M^2X_3$ compounds with $R_3Q^1$ compounds at an elevated temperature in a suitable diluent such as ethanol. Compounds of the type $(R_3Q^1)_2M^2(CO)X$ can be prepared by reacting CO with compounds of the type $(R_3Q^1)_3M^2X$. Similarly, compounds of the type $(R_3Q^1)_2M^2(CO)(NO_2)$ can be conveniently prepared by reacting compounds of the type $(R_3Q^1)_2M^2(CO)X$ with NaNO$_2$, A new method of preparing compounds of the type $(R_3Q^1)_2M^2(NO)X$ is to react compounds of the type $M^2X_3$, including hydrates thereof, with NO in a solvent in which the $M^2X_3$ compound is at least partially soluble. Preferably, the solvent is an alcoholic solvent, such as ethanol. As with the complexes above, an excess of NO is frequently beneficial to increase the rate of the reaction. After the NO ceases to be absorbed by the metal salt, compounds of the type $R_3Q^1$ are simply added to the reaction mixture and allowed to react with the intermediate product previously formed.

Another convenient method of preparation of $$(R_3Q^1)_2M^2(NO)X_2$$

compounds is by reacting 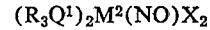 compounds with NOX compounds in a suitable inert diluent under conditions of time and temperature, generally described in paragraphs above, suitable for the preparation of the desired complex compound. Again, approximately stoichiometric amounts of NOX compounds are used, that is, about a 1:1 mole ratio with the metal compound, and preferably no more than about a 10 percent excess of the stoichiometric quantity.

When the formation of the (a) components of the catalyst system involves th use of alcohols or other solvents which might be reactive with the organoaluminum (b) components of the catalyst system, such solvents should be removed by evaporation and replaced by other inert solvents, for example halogenated hydrocarbons.

The molar proportion of the (b) component to the (a) component, to form the catalyst system of the present invention, will generally be in the range of from about 0.1:1 to 20:1, preferably from about 4:1 to about 10:1.

The catalyst is prepared simply by combining the (a) component and the (b) component under conditions of time and temperature which permit the catalytically active mixture to be formed, avoiding excessively high temperatures at which some of the reagents tend to decompose or excessively low temperatures at which some of the reagents tend to crystallize or otherwise tend to become inactive. This combination occurs very readily and, in general, the components can be mixed at any convenient temperature, preferably within the range of —80 to about 100° C. for a few seconds or for several hours in the presence of a diluent in which both the components are at least partially soluble. Any convenient diluent such as benzene, cyclohexane, toluene, chlorobenzene, methylene chloride, ethylene chloride, and the like, can be used for this purpose. Halogenated diluents are generally preferred. The mixing of the two catalyst components is carried out in the substantial absence of air or moisture, generally in an inert atmosphere. After the catalytic reaction mixture is formed, it need not be isolated but can be added directly to the olefin reaction zone as a dispersion in its preparation solvent. If desired, the catalyst components can be separately added, in any order, to the reaction zone either in the presence or absence of the feed olefin.

Olefins applicable for use in the process of the invention are nontertiary, nonconjugated olefins including acyclic mono- and polyenes having at least 3 carbon atoms per molecule including cycloalkyl, cycloalkenyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule. Nontertiary olefins are those olefins wherein each carbon atom, which is attached to other carbon atoms by means of a double bond, is also attached to at least one hydrogen atom.

Some specific examples of acyclic olefins suitable for reactions of this invention include propylene, 1-butene, 2-butene, 1-pentene, 2-pentene, 1-hexene, 1,4-hexadiene, 2-heptene, 1-octene, 2,5-octadiene, 2-nonene; 1-dodecene, 2-tetradecene, 1-hexadecene, 1-phenylbutene-2, 4-octene, 3-eicosene, 3-hexene, 1,4-pentadiene, 1,4,7-dodecatriene, 2-methyl-4-octene, 4-vinylcyclohexene, 1,7-octadiene, 1,5-eicosadiene, 2-triacontene, 2,6-dodecadiene, 1,4,7,10,13-octadecapentaene, 8-cyclopentyl-4,5-dimethyl-1-decene, 6,6-dimethyl-1,4-octadiene, 3-heptene, and the like, and mixtures thereof.

Some specific examples of cyclic olefins suitable for the reactions of this invention are cyclobutene, cyclopentene, cycloheptene, cylooctene, 5-n-propylcyclooctene, cyclodecene, cyclododecene, 3,3,5,5-tetramethylcyclononene, 3,4,5,6,7-pentaethylcyclodecene, 1,5 - cyclooctadiene, 1,5,9-cyclododecatriene, 1,4,7,10-cyclododecatetraene, 6-methyl-6-ethylcyclooctadiene-1,4, and the like, and mixtures thereof.

It will be understood by those skilled in the art that not all olefinic materials will be converted by the present invention with equal effectiveness. The reactions described in the present invention are equilibrium-limited reactions and, barring the selective removal of one or more products from the reaction zone, the extent of conversion will depend upon the thermodynamics of the specific system observed. Thus, conversion of olefinic materials to give specific products can be thermodynamically favored while the reverse reaction is very slow and ineffective. For example, 1,7-octatriene is converted to equilibrium-favored products such as cyclohexene and ethylene. The reverse reaction of ethylene and cyclohexene, correspondingly, goes very poorly. Other well known factors, such as steric hindrance in bulky molecules, significantly and sometimes drastically affect the rates of reaction of some olefins such that extremely long reaction times are required.

The reaction of symmetrical monoolefins with themselves, to give different olefin products, will sometimes proceed very slowly, requiring some double bond migration to take place before the reaction will proceed at a significant rate. For the same reason, the conversion of a mixture of ethylene and a 1-olefin, for example, can be more difficult than the conversion of ethylene with an internal olefin, some double bond isomerization also being required in this instance.

It has also been found that branching also retards the olefin reactivity in proportion to its propinquity to the reacting double bond. Analogously, the presence of inert polar substituents on the olefinic compound appears tolerable only if located some distance from the double bond.

Thus, the present invention is directed primarily to the conversion of those olefins or combination of olefins which are capable of undergoing the olefin reaction to a significant degree when contacted with the catalyst of the present invention under reaction conditions suitable for effecting the olefin reaction.

Presently preferred olefinic feed compounds are those contained in the following classes:

(1) Acyclic monoolefins, including those with aryl, cycloalkyl, and cycloalkenyl substituents, having 3–20 carbon atoms per molecule with no branching closer than about the 3-position to the double bond, no quaternary carbon atoms and no aromatic substitution closer than the 4-position to the double bond, and mixtures of such unsubstituted acyclic monoolefins. Some examples of these are: propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcyclohexene, 4-vinylcyclohexene, eicosene-1, and the like.

(2) A mixture of ethylene and one or more acrylic unsubstituted internal monoolefins of (1). Some examples of such mixtures are: ethylene and butene-2, ethylene and pentene-2, ethylene and hexene-3, ethylene and heptene-3, ethylene and 4-methylpentene-2, ethylene and octene-4, ethylene and dodecene-4, and the like.

(3) Acyclic, non-conjugated polyenes having from 5 to about 20 carbon atoms per molecule, containing from 2 to about 4 double bonds per molecule and having no double bond with branching nearer than the 3-position to that double bond, and having at least one double bond with no quaternary carbon atoms and no aromatic substitution nearer than the 4-position to that double bond, or mixtures of such polyenes. Some examples are: 1,4-pentadiene, 1,5-hexadiene, 1,7-octadiene, 2,6-decadiene, 1,5,9-dodecatriene, 4-methylheptadiene-1,6, 1,7-octadiene, 1,6-octadiene, and the like.

(4) A mixture of ethylene and one or more acyclic polyenes of (3) which contain at least one internal double bond. Some examples are: ethylene and 1,6-octadiene, ethylene and 1,5-decadiene, and the like.

(5) Cyclopentene.

(6) Monocyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to that double bond, and mixtures of such olefins including mixtures with cyclopentene. Some examples are: cycloheptene, cyclooctene, 4-methylcyclooctene, 3-methyl-5-ethylcyclodecene, cyclononene, cyclododecene, norbornene, and the like.

(7) A mixture of one or more of the monocyclic olefins of (6) with either ethylene or with one or more unsubstituted acyclic monoolefins of (1). Some examples of these are: ethylene and cycloheptene, ethylene and cyclooctene, propylene and cyclodecene, pentene-2 and cyclooctene, ethylene and cyclododecene, and the like.

(8) Monocyclic and bicyclic non-conjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of these are: 1,5-cyclooctadiene, 1,5,9-cyclododecatriene, 1,4-cycloheptadiene, norbornadiene, and the like.

(9) A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are: 1,5-cyclooctadiene and ethylene, 1,5,9-cyclododecatriene and ethylene, 1,5,9-cyclododecatriene and pentene-1, and the like.

(10) Polar group-substituted olefinic compounds of classes (1) through (9) containing from about 5 to about 20 carbon atoms per molecule in which the polar group, such as a halogen atom, is sufficiently removed from the active double bond (generally no nearer to the double bond than the 5-position) so as not to interfere with the reaction, and mixtures with unsubstituted members of class (1). Some examples are: 5-chloropentene-1, a mixture of pentene-2 and 5-chloropentene-1, and the like.

According to the process of the invention, the olefins or mixture of olefins to be converted is contacted with the catalyst system at any convenient temperature, avoiding excessively high temperatures at which some of the reagents tend to decompose, or excessively low temperatures at which some of the reagents tend to crystallize or otherwise tend to become inactive. The process will often be carried out at a temperature preferably within the range of from about −30 to about 150° C., more preferably from 0 to about 75° C., at any convenient pressure which is sufficient to maintain a liquid phase. The conversion can be carried out in the presence of any diluent such as that used for the catalyst preparation, if desired. Diluents are not essential but are generally preferred and such diluents can include saturated aliphatics and aromatics such as cyclohexane, xylene, isooctane and the like, and halogenated derivatives thereof. The time of contact will depend upon the desired degree of conversion and the catalysts and olefins utilized, but will, generally, be in the range of from about 0.1 minute to 24 hours, preferably 5–120 minutes. The proportion of catalyst composition to olefin feed in the reaction zone will generally be in the range of from about 0.001–100 millimoles of the Group VIII metal for each mole of olefin in the reaction zone.

Any conventional contacting technique can be used for the olefin conversion, and batchwise or continuous operation can be utilized. After the reaction period, the products can be separated and/or isolated by conventional means such as by fractionation, crystallization, adsorption, and the like. Unconverted feed material or products not in the desired molecular weight range can be recycled to the conversion zone. If desired, the catalyst can be destroyed by treatment with a sufficient amount of water or alcohol prior to the separation of the products, to inactivate the catalyst. Otherwise, after separation of the products, the catalyst can be recycled to the reaction zone. Separation of products can be accomplished by distillation, crystallization, evaporation, and the like.

EXAMPLE I

Disproportionation of pentene-1 over (triphenylphosphine)$_4$(CO)$_2$Ru$_2$(SnCl$_3$)Cl$_3$/methylaluminum sesquichloride A 0.2 g. quantity of (triphenylphosphine)$_4$(CO)$_2$Ru$_2$(SnCl$_3$)Cl$_3$ was charged to a 7-ounce pressure bottle under a nitrogen atmosphere together with 10 ml. chlorobenzene yielding a yellow-orange solution. The solution was treated with 1.5 cc. of methylaluminum sesquichloride at ice bath temperature to give a red-orange solution. A 5 ml. quantity of pentene-1 was added and the reactor was removed from the ice bath and stirred for 3 hours at room temperature.

Analysis of the reaction mixture showed the presence of propylene, butene, pentenes, hexenes, heptenes, and octenes with a conversion of about 6 percent.

EXAMPLE II

Disproportionation of pentene-1 over NO-treated RuCl$_3$/methylaluminum sesquichloride A 0.4 g. quantity of ruthenium trichloride hydrate (38.4 percent Ru) was treated with 70 cc. ethanol and the resulting dark brown solution was filtered, and the filtrate was stirred in an atmosphere of nitric oxide at 20 p.s.i.g. for 4 hours at 75° C. The solution became light red in color. The solution was diluted with about 25 cc. heptane and the volatiles were slowly removed in vacuo leaving a dark red oil. The oil was treated with about 23 cc. of chlorobenzene which yielded a purple-red solution.

The above solution was decanted into a dry 7-ounce pressure bottle under nitrogen and 5 cc. pentene-1- was added. The mixture was then cooled in an ice bath and treated with 3 cc. of a 0.5 molar methylaluminum sesquichloride solution in chlorobenzene. The mixture was removed from the ice bath, stirred for 2 hours at room temperature, and hydrolyzed by the addition of water. Analysis of the organic phase of the reaction mixture showed the presence of ethylene, propylene, butenes, isomerized pentenes, hexenes, heptenes, octenes, nonenes, and decenes. The conversion of the pentene-1 to other olefin products was about 5–6 percent.

EXAMPLE III

Disproportionation of pentene-1 over NO- and triphenylphosphine - treated RuCl$_3$/methylaluminum sesquichloride In a manner similar to that of Example II, 0.4 g. of ruthenium trichloride hydrate and 30 cc. ethanol were stirred in an atmosphere of NO, at 20 p.s.i.g., for 2.5 hours at 75° C. The hot reaction mixture was then filtered into a flask containing 0.8 g. triphenylphosphine and the resulting mixture was treated at 70° C. for about 15 minutes. The mixture was allowed to stand one day at room temperature during which time a solid precipitated. The solid was removed by filtration, washed with ethanol and ether, and dried in vacuo, yielding a pale yellow-green compound melting at 218–224° C.

A 0.2 g. quantity of the above-prepared ruthenium compound was tested for pentene-1 disproportionation in a manner essentially identical with that of Example II in a system which also contained 10 cc. chlorobenzene, 3 cc. of the methylaluminum sesquichloride solution, and 4 cc. of pentene-1. After about 18 hours at room temperature, analysis of the reaction mixture showed the presence of ethylene, propylene, butenes, isomerized pentenes, hexenes, heptenes, and octenes. The conversion of pentene-1 was about 10 percent.

EXAMPLE IV

Disproportionation of pentene-1 over (NO)$_2$RhCl/ methylaluminum sesquichloride A 0.1 g. quantity of (NO)$_2$RhCl, 10 cc. of chlorobenzene, and 0.2 cc. of methylaluminum sesquichloride were mixed at room temperature in a dry 7-ounce pressure vessel under a nitrogen atmosphere. The dark brown rhodium complex dissolved to give a dark brown solution. The vessel was then placed in an ice bath and 7.0 cc. of pentene-1 added. The reaction vessel was removed from the ice bath and the solution stirred for 1 hour at room temperature. Gas evolution was observed, and the solution became progressively lighter in color. Analysis of the reaction mixture showed the presence of butenes, unreacted pentenes, hexenes, heptenes, and octenes. The conversion of pentenes was about 50–60 weight percent.

EXAMPLE V

Disproportionation of pentene-1 over RhCl$_3$ treated with NO and triphenylphosphine A 0.4 g. quantity of RhCl$_3$·3H$_2$O and 30 cc. of ethanol were heated at 75° C. for 2.5 hours under a 20 p.s.i.g. pressure of nitric oxide. The hot reaction mixture was filtered, and the filtrate was treated with 0.8 g. of triphenylphosphine for 15 minutes at 70° C. This reaction mixture yielded a reddish-brown precipitate on standing. The precipitate had a melting point of 233–236° C. This material was (triphenylphosphine)$_2$Rh(NO)Cl$_2$.

After drying, a 0.2 gram quantity of the above solid was placed in a 7-ounce pressure vessel under a nitrogen atmosphere together with 10 cc. chlorobenzene. The mixture was cooled to 0° C. and treated with 1.5 millimoles of methylaluminum sesquichloride, and 4 cc. of pentene-1. The reactor was removed from the ice bath and allowed to stand overnight.

The reaction mixture was hydrolyzed and the organic phase was analyzed by gas-liquid chromatography which indicated the presence of ethylene, propylene, butenes, isomerized pentenes, hexenes, heptenes, and octenes. About 5 percent of the pentene feed was converted.

Equivalent results were obtained in a similar test in which the catalyst was prepared utilizing the nitric oxide treatment after the triphenylphosphine reagent was present.

EXAMPLE VI

Disproportionation of hexene-1 over [($\pi$-allyl)$_2$RhCl]$_2$/methylaluminum sesquichloride In a dry 7-ounce pressure vessel, under a nitrogen atmosphere, was placed 0.1 g. of [($\pi$-allyl)$_2$RhCl]$_2$, 10 cc. chlorobenzene, and 0.5 cc. methylaluminum sesquichloride at room temperature. The yellow homogeneous solution was cooled in an ice bath as 5.0 cc. of hexene-1 was added. The reaction vessel was removed from the bath, stirred for several hours, and the reaction mixture analyzed by gas-liquid chromatography. Butenes, pentenes, heptenes, octenes, nonenes, decenes, and unreacted hexenes were found in the reaction mixture. The conversion of hexenes was about 40–50 percent.

EXAMPLE VII

Conversion of pentene-2 over [Fe(NO)$_2$Cl]$_2$/methylaluminum sesquichloride

A 0.2 g. quantity of [Fe(NO)$_2$Cl]$_2$ was charged into a 7-ounce pressure bottle under a nitrogen atmosphere, followed by 10 cc. chlorobenzene, 6.0 cc. of a 1 molar solution of methylaluminum sesquichloride in chlorobenzene, and 6 cc. pentene-2 at room temperature. After being stirred for about 5½ hours at room temperature, the reaction mixture, when analyzed, indicated about a 1 percent conversion of pentene-2 to butenes and hexenes.

EXAMPLE VIII

Conversion of pentene-2 over NO-treated (triphenylphosphine)$_2$CoCl$_2$/methylaluminum sesquichloride A 0.3 g. quantity of (triphenylphosphine)$_2$CoCl$_2$ was charged into a 7-ounce pressure bottle under an inert gas atmosphere followed by 15 cc. of chlorobenzene. The bottle was then pressured with nitric oxide at 20 p.s.i.g. for 3.3 hours at room temperature. After venting the bottle and flushing with nitrogen, 6 cc. of a 0.5 molar solution of methylaluminum sesquichloride and 5 cc. of pentene-2 were then added to the solution which had been cooled to 0° C. The mixture was then stirred for 2 hours at 0° C., followed by hydrolysis by the addition of water. Analysis of the organic phase showed the presence of hexenes, heptenes, octenes, decenes, and unreacted pentene.

EXAMPLE IX

Conversion of pentene-2 over NO-treated and triphenylphosphine-treated IrCl$_3$/methylaluminum sesquichloride A 0.4 g. quantity of IrCl$_3$ hydrate was mixed with 30 cc. ethanol and contacted with 20 p.s.i.g. nitric oxide for 4 hours and at 75° C. The mixture was then filtered hot, the filtrate being allowed to contact 0.8 g. of triphenylphosphine. This mixture was heated at 70° C. for 15 minutes and then allowed to stand overnight at room temperature. The mixture, containing a dark brown solid, was filtered, washed with ethanol and ether, and dried. This material was (triphenylphosphoine)$_2$Ir(NO)Cl$_2$.

A 0.15 g. quantity of the above-prepared material was charged into a 7-ounce pressure bottle followed by 10 cc. chlorobenzene and 3 millimoles of methylaluminum sesquichloride and 5 cc. pentene-2, the addition being carried out while the reaction vessel was in an ice bath.

The reaction mixture was stirred for 2.5 hours at room temperature. Analysis of the mixture showed about a 1–2 percent conversion of the pentene-2 to butenes and hexenes.

EXAMPLE X

Preparation of (triphenylphosphine)$_2$Rh(NO)(NO$_2$)Cl

A 0.5 g. quantity of (triphenylphosphine)$_3$RhCl was dissolved in 15 ml. benzene in a dry 7 oz. reaction flask which had been flushed with nitrogen. The flask was then flushed with NO and then subjected to 20 p.s.i.g. NO pressure with stirring for 0.5 hr. at room temperature during which time the solution turned a dark green. The solution was then chilled and diluted with 10 ml. n-pentane resulting in the precipitation of green crystals. Isolation by filtration, washing, and drying yielded 0.2 g. of a material which had a melting point of 154–156° C. (with decomposition).

Elemental analysis showed the following in weight percent. Found: C, 59.4; H, 4.2; N, 3.5; Cl, 4.9. Calculated: C, 58.5; H, 4.1; N, 3.8; Cl, 4.8.

An infrared spectrum of the material (in KBr disc) was also consistent with the structure and formula (triphenylphosphine)$_2$Rh(NO)(NO$_2$)Cl.

When 0.15 g. of this complex was contacted with 2.25 g. pentene-2 in the presence of 20 ml. chlorobenzene, and 2.36 g. of an 8.5 weight percent solution of ethylaluminum dichloride in chlorobenzene at 60° C. for 1.5 hrs., a portion of the pentene-2 was found to be converted to approximately equal amounts of both higher and lower boiling materials.

EXAMPLE XI

Preparation of (triphenylarsine)$_2$Rh(NO)(NO$_2$)Cl

In a manner essentially identical to that of the previous example 0.3 g. of (triphenylarsine)$_3$RhCl was treated with NO in benzene solution for 35 minutes. A 0.20 g. quantity of olive colored (triphenylarsine)$_2$Rh(NO)(NO$_2$)Cl was isolated. The re-crystallized material melted at 205–208° C.

EXAMPLE XII

Preparation of (triphenylphosphine)$_2$Rh(NO)(NO$_2$)Cl

A 0.32 g. quantity of (triphenylphosphine)$_2$Rh(CO)(NO$_2$)

was dissolved in 10 ml. chloroform under a nitrogen atmosphere. A 5.0 ml. quantity of a 0.1 M solution of nitrosyl chloride in benzene was added resulting in a rapid change of color from the clear yellow to a dark green. The mixture was stirred for an hour at room temperature and filtered. To the filtrate was added 20 ml. n-pentane and the mixture was cooled, resulting in the formation of green crystals of (triphenylphosphine)$_2$Rh(NO)(NO$_2$)Cl which were isolated by filtration yielding a total of 0.22 g. of this complex.

EXAMPLE XIII

Preparation of (triphenylarsine)$_2$Rh(NO)(NO$_2$)Cl

In a manner similar to that of the preceding example, 0.5 g. of (triphenylarsine)$_2$Rh(CO)Cl was treated with NO gas in 20 ml. benzene for 25 min. at room temperature. To this solution was then added 20 cc. n-pentane resulting in the formation of a precipitate. A 0.4 g. quantity of (triphenylarsine)$_2$Rh(NO)(NO$_2$)Cl was isolated, melting at 208–210° C. (dec.). The elemental analysis and infrared spectrum were consistent with the indicated identity of the compound.

EXAMPLE XIV

Preparation of (triphenylphosphine)$_2$Rh(NO)(NO$_2$)Cl

In a manner similar to that of the preceding example 0.5 g. (triphenylphosphine)$_2$Rh(CO)Cl in 20 ml. benzene were treated with 20 p.s.i.g. NO for 20 min. at room temperature. The addition of 20 ml. n-pentane resulted in precipitation of a green solid, which, after isolation by filtration, washing, and drying, weighed 0.50 g. The elemental analysis and infrared spectrum of this solid was consistent with the formula (triphenylphosphine)$_2$Rh(NO)(NO$_2$)Cl and a mixed melting point of this solid and a previously identified sample showed no depression.

EXAMPLE XV

Preparation of (triphenylphosphine)$_2$Ir(NO)Cl$_2$

A 0.4 g. quantity of IrCl$_3$·hydrate (53.02% Ir) was dissolved in 30 ml. ethanol and placed under 20 p.s.i.g. NO pressure for 2.5 hrs. at 80° C. The reaction mixture was then filtered hot onto 1.5 g. triphenylphosphine. The complex (triphenylphosphine)$_2$Ir(NO)Cl$_2$ was precipitated from this hot mixture and was isolated by filtration, washing, and drying. A second crop of crystals of this material was obtained by cooling the filtrate.

EXAMPLE XVI

Preparation of (triphenylphosphine)$_2$Rh(NO)Cl$_2$

A 0.2 g. quantity of (triphenylphosphine)$_3$RhCl was mixed with 10 ml. methylene chloride and 0.15 ml. of a IM solution of NOCl in chlorobenzene in a nitrogen-purged 7 oz. reaction flask. The mixture was stirred for about 30 minutes at room temperature, then diluted with methanol resulting in the precipitation of a rust-brown solid. The material was isolated by filtration, washing, and drying, yielding 0.1 g. of (triphenylphosphine)$_2$Rh(NO)Cl which, after recrystallization, had a melting point of 232–234° C. The elemental analysis and infrared spectrum of this material were consistent with the above formula.

In the practice of the process of the invention, the feed olefins, catalyst and operating conditions disclosed include combinations wherein solid, rubbery materials are produced; for example, if a propylene feed and a suitable aluminum-containing adjuvant such as an organoaluminum dihalide or an organoaluminum sesquihalide are used, a solid rubbery material is produced having characteristics of ethylene-propylene rubber. This rubbery material is useful in the manufacture of tires, wire coating, footwear and other industrial products.

The homogeneous catalysts of this invention can be deposited upon a suitable support or carrier and used in the olefin reaction, preferably where the olefin feed is in the vapor phase. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyldimethylphosphine, and the like.

The support can be impregnated with the homogeneous catalyst by wetting the support with a solution of the catalyst in a solvent which is then evaporated. Among solvents suitable are relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is usually activated prior to the impregnation step.

Impregnation and evaporation conditions in preparing the catalyst are conventional, being carried out at temperatures up to about 150° C. Operating conditions in carrying out the olefin reaction are the same for the supported and the non-supported homogeneous catalyst systems.

We claim:

1. A process of preparing a metal complex which comprises the steps of contacting a metal salt represented by the formula

M$^2$X$_3$ or hydrate thereof with NO for a time sufficient for the NO to cease being absorbed by the metal salt, and adding to the metal salt-NO reaction mixture a compound represented by the formula

R$_3$Q$^1$ wherein M$^2$ is rhodium or iridium, Q$^1$ is phosphorus or arsenic, X is a halogen, and R is an aromatic or saturated aliphatic hydrocarbon radical having up to 20 carbon atoms including alkoxy and halo derivatives thereof.

2. The process according to claim 1 wherein said metal complex is represented by the formula (R$_3$Q$^1$)$_2$M$^2$(NO)X$_2$ 3. A process for preparing the metal complex according to claim 2 wherein said hydrate is represented by M$^2$X$_3$·3H$_2$O.

4. A process of preparing the metal complex according to claim 2 wherein said contacting of M$^2$X$_3$ or hydrate thereof with NO and R$_3$Q$^1$ is accomplished in the presence of a solvent in which said M$^2$X$_3$ is at least partially soluble, and said X is fluorine, chlorine, bromine, or iodine.

5. A process of preparing the metal complex according to claim 4 wherein said solvent is an alcoholic solvent.

6. A process of preparing a metal complex according to claim 5 wherein said alcoholic solvent is ethyl alcohol.

7. A process of preparing the metal complex according to claim 1 wherein said M$^2$ is rhodium.

8. The process according to claim 7 wherein said R is phenyl, said Q is phosphorus, and said X is chlorine.

9. A process for preparing metal complex according to claim 1 wherein said M$^2$ is iridium.

10. A process according to claim 9 wherein said R is phenyl, said Q is phosphorus, said M$^2$ is iridium, and said X is chlorine.

11. A metal complex represented by the formula (R$_3$Q$^1$)$_2$M$^2$(NO)(NO$_2$)X wherein R is an aromatic or saturated aliphatic radical having up to 20 carbon atoms, including alkoxy and halo derivatives thereof, Q$^1$ is phosphorus or arsenic, M$^2$ is rhodium or iridium, and X is halogen.

12. The metal complex of claim 11 wherein M$^2$ is rhodium.

13. The metal complex of claim 12 wherein said R is phenyl, said Q$^1$ is phosphorus, and said X is chlorine.

14. The metal complex of claim 12 wherein said R is phenyl, said Q$^1$ is arsenic, and said X is chlorine.

15. The metal complex of claim 11 wherein said M$^2$ is iridium.

16. A process of preparing a metal complex which comprises contacting a starting compound represented by (R$_3$Q$^1$)$_3$M$^2$X or (R$_3$Q$^1$)$_2$M$^2$(CO)X with NO in the presence of a diluent in which said starting compound is at least partially soluble for sufficient time and at sufficient temperature for the formation of said metal complex, wherein R is an aromatic or saturated aliphatic radical having up to 20 carbon atoms, including alkoxy and halo derivatives thereof, Q$^1$ is phosphorus or arsenic, M$^2$ is rhodium or iridium, and X is halogen.

17. The process according to claim 16 wherein said metal complex is represented by (R$_3$Q$^1$)$_2$M$^2$(NO)(NO$_2$)X 18. A process of preparing a metal complex which comprises contacting a starting compound represented by $(R_3Q^1)_2M^2(CO)(NO_2)$ with NOX in the presence of a diluent in which said starting compound is at least partially soluble for sufficient time and at sufficient temperature for the formation of said metal complex, wherein R is an aromatic or saturated aliphatic radical having up to 20 carbon atoms, including alkoxy and halo derivatives thereof, $Q^1$ is phosphorus or arsenic, $M^2$ is rhodium or iridium, and X is halogen.

19. The process according to claim 18 wherein said metal complex is represented by $(R_3Q^1)_2M^2(NO)NO_2)X$.

References Cited

UNITED STATES PATENTS

| 3,450,732 | 6/1969 | Wilke et al. | 260—429 R |
| 3,511,885 | 5/1970 | Hughes | 260—429 R |
| 3,558,518 | 1/1971 | Zuech | 260—429 R |

PATRICK P. GARVIN, Primary Examiner

A. P. DEMERS, Assistant Examiner

U.S. Cl. X.R.

252—429 B; 260—94.9 B, 270 R, 429 L, 429 CY, 439 R, 666 A, 677 R, 680 R, 683 D, 683.15 D, 683.2, 651 R, 658 R